United States Patent [19]

Hamm

[11] Patent Number: 4,508,746

[45] Date of Patent: Apr. 2, 1985

[54] LOW CALORIE EDIBLE OIL SUBSTITUTES

[75] Inventor: Donald J. Hamm, New Providence, N.J.

[73] Assignee: CPC International Inc., Englewood Cliffs, N.J.

[21] Appl. No.: 506,234

[22] Filed: Jun. 20, 1983

[51] Int. Cl.³ .............................................. A23D 5/00
[52] U.S. Cl. .................................... 426/601; 426/611; 426/612; 426/804
[58] Field of Search ......................... 426/611, 612, 601

[56] References Cited

U.S. PATENT DOCUMENTS

| | | | |
|---|---|---|---|
| 2,485,639 | 10/1949 | Vahlteich et al. | 426/611 |
| 2,701,203 | 2/1955 | Gooding et al. | 426/611 |
| 3,004,853 | 10/1961 | Julian et al. | 426/612 X |
| 3,227,559 | 1/1966 | Radlove | 426/611 |

OTHER PUBLICATIONS

"The Digestibility of Stearyl Alcohol, Isopropyl Citrates, and Stearyl Citrates, and the Effect of These Materials on the Rate and Degree of Absorption of Margarine Fat", Clarence E. Calbert et al., 1951, University of Southern California, pp. 294–305.

Primary Examiner—Robert Yoncoskie

[57] ABSTRACT

A low calorie substitute for the edible oil component in oil-based food compositions is disclosed, which low-calorie substitute is comprised in substantial proportion of at least one-low calorie oil component selected from the group consisting of thermally stable polycarboxylic acids having 2 to 4 carboxylic acid groups esterified with saturated or unsaturated alcohols having straight or branched carbon chains of from 8 to 30 carbon atoms. A low-calorie substitute of the present invention exhibits physical and functional properties substantially comparable to triglyceride vegetable oils, including the ability to serve as a cooking oil or to replace a portion of the edible oil in a food composition, such as a margarine or a mayonnaise. At the same time, the low-calorie substitute of the present invention has the additional advantage that it is substantially unsusceptible to enzymatic hydrolysis by lipases and therefore does not represent a caloric source in the diet.

2 Claims, No Drawings

LOW CALORIE EDIBLE OIL SUBSTITUTES

BACKGROUND OF THE INVENTION

In recent years, the poor nutritional habits of the average American have received substantial criticism. One of the most common of these criticisms concerns the high proportion of fats and oils found in the average diet. When taken together with the limited activity level typical of many Americans, this high intake of fats and oils has resulted in significant weight problems which effect a large proportion of the population. In addition to the substantial personal displeasure most people find in such extra weight, there is a growing concern about the significant health problems which have been shown to be associated with such higher weight levels.

Many people with a weight problem of this kind have taken various actions to reduce and control their weight. Periodically, fad diets and other quick weight loss programs receive a great deal of publicity. In addition, many people have successfully pursued exercise programs to counteract their normally sedentary lifestyles. Another popular method has been to substitute popular high-calorie foods with substantially similar foods which are prepared with a reduced calorie content. Foods and beverages having a designation such as "lite" and "light" have become common in the marketplace. Chiefly, these products have substituted similar, but lower calorie naturally available ingredients for high calorie components of the food or beverage.

Another direction which has been taken has been to formulate food products with newly engineered ingredients. Such ingredients are chosen to have the same or similar physical properties, but are less digestible and thus are lower in available calories. Examples of compounds which are proposed for such use are found in several prior references. One such reference is U.S. Pat. No. 3,579,548. There it is shown that certain glycerol esters of certain branched carboxylic acids have the same physical properties as ordinary triglyceride fat but are not digested or absorbed to the same extent when eaten.

U.S. Pat. No. 2,962,419 to Minich shows dietetic compositions which are the product of the complete esterification of a polyhydric alcohol, such as neopentyl glycol, trimethylolethane, trimethylolpropane, pentaerythritol and dipentaerythritol, with fatty acids.

U.S. Pat. No. 3,579,548 to White shows glycerol esters of certain branched carboxylic acids which have the same physical properties as ordinary triglyceride fat but are not digested or absorbed to the same extent when eaten.

U.S. Pat. No. 3,600,186 to Mattson and Volpenhein shows sugar fatty acid esters and sugar alcohol fatty acid esters having at least 4 fatty acid ester groups. These compounds are said to have the physical properties of ordinary triglyceride fat, but are not absorbed to the same extent when eaten.

Canadian Pat. No. 1,106,681 to Trost shows glycerol dialkyl ether compounds which are said to have functional properties similar to those of conventional fats, but which are not absorbed in the digestive tract to any significant degree.

In *New Fat Products: Glyceride Esters of Adipic Acid JAOCS*, Vol. 36, page 667 (1959), Ward, Gros and Feuge have reported highly viscous edible oils for use in the food industry, primarily as lubricants and coatings. These oils are formed first by reacting two glycerol molecules with a dibasic acid, such as fumaric, succinic and adipic acids, and then reacting one of the carboxylic acid groups of each glycerol moiety with a fatty acid.

SUMMARY OF THE INVENTION

This invention relates to edible oil substitutes having minimal caloric impact in the diet. In particular, the present invention relates to a low-calorie substitute for at least a portion of the edible oil component in oil-based food compositions which low-calorie substitute is comprised in substantial proportion of at least one low-calorie oil component selected from the group consisting of thermally stable polycarboxylic acids having 2 to 4 carboxylic acid groups esterified with saturated or unsaturated alcohols having straight or branched carbon chains of from 8 to 30 carbon atoms.

OBJECTS OF THE PRESENT INVENTION

It is an object of the present invention to provide a low-calorie substitute for the edible oil component in oil-based food compositions, which may be useful as a low-calorie cooking oil, or combined with other suitable ingredients to produce a food composition, such as a margarine or mayonnaise.

The objects, features and advantages of the present invention will become more apparent in light of the following detailed description of the preferred embodiment thereof.

According to one embodiment of the present invention, there is provided a low-calorie substitute for at least a portion of the edible oil component in oil-based food compositions, which low-calorie substitute is comprised in substantial proportion of at least one low-calorie oil component selected from the group consisting of thermally stable polycarboxylic acids having 2 to 4 carboxylic acid groups esterified with saturated or unsaturated alcohols having straight or branched carbon chains of from 8 to 30 carbon atoms.

According to another embodiment of the present invention, there is provided a method for reducing the available calories in a food composition having an edible oil component, which method consists of replacing at least a substantial portion of the edible oil in such food composition with at least one low calorie substitute selected from the group consisting of thermally stable polycarboxylic acids having 2 to 4 carboxylic acid groups esterified with saturated or unsaturated alcohols having straight or branched carbon chains of from 8 to 30 carbon atoms.

According to another embodiment of the present invention, there is provided a food composition having an edible oil component having reduced available calories in which the edible oil component comprises in substantial proportion at least one low calorie substitute selected from the group consisting of thermally stable polycarboxylic acids having 2 to 4 carboxylic acid groups esterified with saturated or unsaturated alcohols having straight or branched carbon chains of 8 to 30 carbon atoms.

DETAILED DESCRIPTION OF THE PRESENT INVENTION

Edible oils, such as triglyceride vegetable oil, are used in various oil-based food compositions. For example, an edible oil may be used in nearly pure form as a cooking or frying oil, or as a shortening. In addition, such an oil may be combined with other ingredients to form any of several food compositions, such as margarine, mayonnaise, pourable salad dressings, or a release coating. Further, a vegetable fat, in the form of a hard butter, may be used in confectionary.

The low-calorie substitutes of the present invention may be chosen so as to exhibit substantially all of the physical and functional properties of a triglyceride vegetable oil for any of these or similar uses. In addition, the low-calorie substitutes of the present invention are not susceptible to enzymatic hydrolysis with lipases, and therefore are believed to exhibit edible oil functionality with fewer or no absorbable calories.

A typical triglyceride oil may be represented as:

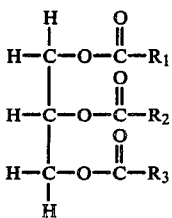

where $R_1$, $R_2$ and $R_3$ may be the same or different and represent the chains of fatty acids which are esterified onto the trihydric glycerol backbone. In the present invention, the fatty alcohol analogues of similar fatty acids are esterified onto a polycarboxylic acid backbone. Thus, employing the tribasic tricarballylic acid:

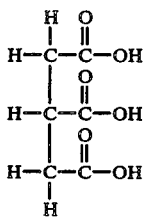

as a typical polycarboxylic substrate acid, tri-esterification with fatty alcohols would yield

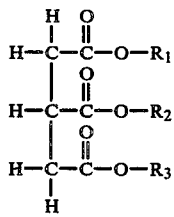

where $R_1$, $R_2$ and $R_3$ are the same or different and represent the chains of the fatty alcohols.

Because the position of the esters is essentially the same as that of triglyceride oils, the low-calorie substitutes of the present invention have substantially similar functional and physical properties. However, the ester units themselves are reversed from the corresponding esters present in triglyceride oils. Because of this positional reversal the esters in the low calorie substitutes of the present invention are not susceptible to enzymatic hydrolysis with lipases. Therefore, these low-calorie substitutes are not seen to represent absorbable calories in the diet.

The methods by which such oils employed in the present invention may be formed is not new, and many of the oils themselves are shown in the prior art.

For example, U.S. Pat. No. 2,005,414 to Dykstra shows polycarboxylic acid esters of unsaturated alcohols, and their use in plastic and coating compositions. There is no suggestion that such esters might be useful in edible-oil based food compositions however, nor is there any suggestion that a reduction in absorbable calories could be obtained thereby.

U.S. Pat. No. 2,122,716 to Graves discloses hydroxycarboxylic acid esters of alcohols having 10 to 14 carbon atoms and methods for preparing such esters. Among the compounds specifically mentioned are tridodecyl citrate, dodecyl lactate and dodecyl tartrate. These esters are disclosed as being particularly useful as softeners in cellulose derivative compositions comprising cellulose nitrate or cellulose ethers and particularly useful in the manufacture of leather. Alternatively, they may be employed with natural or synthetic resins, bituminous substances, other plasticizers, or solvents, pigments and fillers or the like for use in molding, as adhesives, binders, or as impregnating, toughening and waterproofing agents for paper, wood, textiles and stone or the like. Although the derivatives are also disclosed as having no tendency to become rancid, there is no mention of any use in a edible-oil based food composition, and, in particular, no mention of any reduction in absorbable calories which can be obtained thereby.

In U.S. Pat. No. 2,485,639 to Vahlteich, Gooding and Neal glyceridic oil compositions such as cooking and baking fats are provided which have extended range and utility. This is accomplished by the addition of less than 2% (by weight of the glyceride oil) of a mixture of mono-alkyl, dialkyl and tri-alkyl citrates or mono-alkylene, di-alkylene and tri-alkylene citrates. The additives, however, are not suggested as replacers for glyceridic oils in food compositions, and the amount of any such additive would have no noticeable effect on the available calories of any such glyceridic oil based food composition.

Similarly, in U.S. Pat. No. 2,578,649 to Vahlteich, Gooding and Neal glyceridic oil compositions are protected from deterioration by the addition of less than 2% (by weight of the glyceridic oil) of a mono-alkyl, mono-alkylene, di-alkyl or di-alkylene ester of a simple functional aliphatic polycarboxylic acid containing at least three carboxyl groups and no functional groups other than hydroxyl and carboxyl groups. In addition to their use in retarding deterioration of glyceridic oils, the additives are said to provide valuable surface active effects in such oils, such as the prevention of the exudation of moisture from emulsions containing such glyceridic oils. The additives, however, are not suggested as replacers for glyceridic oils in food compositions, and the amount of any such additive would have no noticeable effect on the available calories of any such glyceridic oil based food composition.

U.S. Pat. No. 2,701,203 to Gooding, Vahlteich and Brown shows glyceridic oil containing food products to which are added 2% or less (by weight of the glyceridic oil) of a mono-ester of an aliphatic tricarboxylic acid. These mono-esters are disclosed as markedly improving the shelf-life of food products containing glyceridic oils and maintaining the flavor-stability of glyceridic oils in emulsions, particularly in acidic emulsions. The monoesters are also reported to increase the fluidity and improve the dispersion of components in culinary batters.

The mono-esters, however, are not suggested as replacers for glyceridic oils in food compositions, and the amount of any such additive would have no noticeable effect on the available calories of any such glyceridic oil based food composition.

U.S. Pat. No. 3,124,463 to Houken and Jonker shows a method of reducing the spattering properties of margarine by the addition to the margarine of a small amount of a phosphatide and partial esters of long chain fatty alcohols and citric, tricarballylic or tartaric acids. The reference, however, does not suggest the use of such partial esters as replacers for the glyceridic oil component of such a margarine, and the amount of any such additive would have no noticeable effect on the available calories of any such margarine.

U.S. Pat. No. 3,433,824 to Horsley shows alkyl esters of carboxylic acids produced by reacting such acids with alkylene oxide. The esters thus disclosed are not suggested as replacers for glyceridic oils in food compositions, however, nor is there any mention that any reduction in absorbable calories could be obtained thereby.

Suitable polycarboxylic acids for use in the present invention include dibasic, tribasic and tetrabasic carboxylic acids. Polycarboxylic acids having additional carboxyl groups might also be suitable, but the molecular weight of such esterified compounds becomes correspondingly higher. Viscosity increases generally with molecular weight and at some point the viscosity of such esters becomes unsuitable in various food applications.

Suitable polycarboxylic acids would include such groups as alkyl, alkylene as well as aryl, arylalkyl and arylalkylene acids. Specifically suggested dibasic acids, are oxalic, malonic, maleic, fumaric, succinic and longer alkyl chain acids, oxaloacetic, and dihydrophthalic acid. Suggested tribasic acids are tricarballylic, citric and aconitic acids, with tricarballylic being particularly preferred. Citric acid based tri-esters have been shown to exhibit the desired physical properties of a triglyceride oil. However, such compounds are thermally unstable, and therefore unsuitable for most usages unless the free hydroxy group of the citric acid moiety is protected by a suitable blocking group. Tetrabasic acids would include any of the above moieties containing the additional carboxyl group(s). Polyfunctional compounds of this kind together with a process for their preparation are shown in U.S. Pat. No. 4,306,079 to Gutierrez and Lamberti.

Similarly, the alcohols which are suitable in forming the esters employed in the present invention include saturated and unsaturated alcohols having straight or branched carbon chains of 8 to 30 carbon atoms. It is assumed that specific triglyceride oils will be most easily replaced by triesters of the fatty alcohols most analogous to the chains of the triglyceride. Although the present invention envisions within its scope the complete replacement of the edible oil component in food compositions, the amount of edible oil which may actually be replaced in any such application may be varied, depending on the ability of the replacement to exactly match the functionality of the edible oil, the degree to which reduction in calories is desired, the relative cost of the low-calorie replacement, and other factors.

Thus, employing the low-calorie substitutes shown herein, it has been found that food compositions can be formulated with less absorbable calories by replacing at least a substantial proportion of the edible oil component with a low-calorie substitute of the kind disclosed. An edible oil substitute of this kind exhibits substantially all of the physical and functional properties of a triglyceride vegetable oil, however, the low-calorie component is essentially unsusceptible to enzymatic hydrolysis with lipases. It is believed, therefore, that the low-calorie component exhibits edible oil functionality with no absorbable calories.

One example of such a low-calorie substitute, and one of the most preferred, is trioleyltricarballylate, which has the empirical formula $C_{60}H_{110}O_6$, and a formula weight of 927.54 atomic mass units. This compound can best be represented by the structural formula:

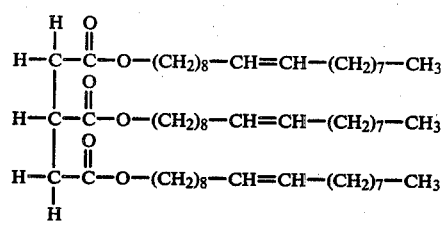

This may be contrasted with the structural formula of the corresponding triglyceride oil, which would be represented as:

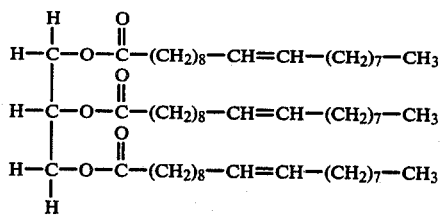

This particular low-calorie substitute, trioleyl tricarballylate, is known to have previously been present in formulated edible oils. However, its presence as a harmless impurity in a minor additive for glyceride oils was never sufficient to have any detectable effect on the available calories of such oil compositions.

Trioleyltricarballylate, in a form suitable for the practice of the present invention, was prepared and tested in the following manner.

Tricarballylic acid, commercial grades of oleic acid and alcohol and molecular sieves (3A, 8–12 mesh) were purchased from Aldrich, Milwaukee, WI. Purified "oleyl alcohol" was prepared by Ny Chek Prep Inc., Elysian, MN from the commercial grade oleyl alcohol. HPLC grade solvents were obtained from Burdick & Jackson Labs, Inc., Lake Bluff, IL. All other chemicals were reagent grade and were used as received.

Trioleyltricarballylate was synthesized under solvent-free conditions as described in U.S. Pat. No. 2,518,678 to Gooding, Vahlteich and Neal. Tricarballylic acid (2.8 kg, 16.1 moles, 99% + pure) was reacted with 20% excess purified "oleyl alcohol" (15.5 kg, 99% fatty alcohols, 80% oleyl alcohol) in a 50 L glass reactor equipped with a thermocouple, vacuum valve, nitrogen sparger, mechanical stirrer and condenser under conditions of 135°–150° C. and a vacuum of 7 mm Hg. The reaction was allowed to proceed until evolution of water ceased at about ¾ of the theoretical yield. The reaction was then driven to completion by addition of more than enough molecular sieves to absorb the remaining water, followed by continued heating at 135°

C. and a nitrogen flush for several more hours. The progress of the reaction was monitored by Thin Layer Chromotography (TLC).

All TLC analysis were carried out on 0.25 mm Supelco hard layer Silica Gel G plates followed by a chromic acid spray and char detection. The solvent system employed was a combination of 90% hexane and 10% ethyl acetate.

The final product was filtered to remove the molecular sieves and the excess alcohol was removed to a residual level of 0.1% by molecular distillation on a glass wiped-film molecular still (Pope Wiped-Film Molecular Still, 2" model equipped with carbon blades, Pope Scientific, Inc., Monomenee Falls, WI) under conditions of 250° C., 0.1 mm Hg and a flow rate of approximately 35 drops/min. The final purification was carried out by a two step continuous adsorption of the polar impurities on silica using a preparative HPLC isolation done with a Waters preparative LC/System 500A, equipped with two 500 g. silica gel cartridges and a refractive index detector. A solution of 2.5 Kg of alcohol-free trioleyltricarballylate dissolved in 3 volumes of LC grade cyclopentane was filtered to remove the remaining molecular sieves and pumped continuously at a rate of 100 ml/min from the solvent supply reservoir through two fresh 500 g. silica gel cartridges previously pre-equilibrated with cyclopentane. The effluent from the column was monitored by Refractive Index (RI) and Ultraviolet (UV) absorbance measured at 300 nm. After the trioleyltricarballylate supply was exhausted, the columns were washed with cyclopentane and effluent collected until the RI response returned to baseline. The columns were replaced with 2 fresh cartridges, re-equilibrated with solvent and the process repeated using the effluent of the first step. The final eluate was reduced in volume under a stream of $N_2$ at 50°–60° C. and desolventized at 65°–75° C. under 1.0 mm Hg vacuum to produce a crystal clear colorless oil. This finished product was stored under nitrogen head space in glass bottles in the dark at 4° C.

The procedure was intended to carry through to completion, insofar as possible, the preparation of the triester. It should be noted, however, that the mono- and diesters were reported to be satisfactory emulsifiers. See U.S. Pat. No. 2,485,639 to Vahlteich, Gooding and Neal discussed above. It may well be advantageous in practice to halt the procedure somewhat short of completion in order to take advantage of the properties of these compounds as emulsifiers.

For use as a food composition such as a cooking oil, the low calorie substitute employed in the present invention may be comprised of, for example, trioleyltricarballylate in the form prepared above, alone or in combination together with a proportion of one or more similar low-calorie substitutes or edible oils as desired. In addition, additives and stabilizers known to be useful in the formulation of a cooking oil from edible oils may be employed as desired to produce a cooking oil having desirable properties, such as shelf-life, spatter-resistence, flavor characteristics and the like.

For use as a margarine composition, a margarine may be formulated according to principles well known to the art, however, the edible oil component of the margarine would be at least partially replaced by at least one low-calorie component, such as trioleyltricarbally- late, alone or in combination with a proportion of one or more edible oils as desired. The edible oil component replaced could be either or both of (1) the liquid phase or (2) the hard portion, which hard portion of the margarine could be employed as prepared or hydrogenated for use in a manner well known to the art. In addition, additives and stabilizers known to be useful in the formulation of the edible oil component of a margarine may be employed as desired to produce a margarine having desired properties, such as shelf-life, melting and flavor characteristics, and the like.

For use as a mayonnaise composition, a mayonnaise may be formulated according to principles well known to the art, however, the edible oil component of the mayonnaise would be replaced by at least one low-calorie component, such as trioleyltricarballylate, alone or in combination with a proportion of one or more edible oils as desired. In addition, additives and stabilizers known to be useful in the formulation of the edible oil component of a mayonnaise may be employed as desired to produce a mayonnaise having desired properties, such as shelf-life, flavor characteristics and the like.

A margarine was prepared using a commercial 80% corn oil formula, substituting trioleyltricarballylate as prepared above, for the liquid vegetable oil component. The solid fat component employed was partially hydrogenated corn oil. The aqueous phase was pasteurized at 160° F., cooled to 45° F. and added to the oil phase maintained at 120° F. It was then homogenized with a Tekmar Model SD-45 homogenizer equipped with the G 456 generator head and cooled to below 70° F. with continual homogenization. The solidified product was extruded into ¼ lb. sticks, foil wrapped, and refrigerated at least 24 hours at 45° F. prior to evaluation.

A one inch cube of this margarine was placed on a disk in a 90° F. environmental chamber and the height of the cube measured at various times after the exposure to elevated temperature.

A whole egg was fried with the test margarine and evaluated against control vegetable oil margarine for degree of spattering and subjective evaluation of appearance of the fried egg.

Cakes were baked using a commercially available self-rising cake flour and either commercial corn oil margarine (control) or this margarine, according to directions on the package and evaluated for cake volume and appearance relative to the control.

The trioleyltricarballylate margarine was very similar in overall appearance and texture to the control margarine but it was softer and melted more quickly than the control. The trioleyltricarballylate based margarine did, nevertheless, perform well in the egg frying and cake baking simulations.

The present esters are essentially not attacked, or hydrolyzed, by the enzyme pancreatic lipase, and, therefore, it is believed that they cannot be assimilated in the human digestive tract. By contrast, glycerol esters such as the triglyceride olive oil, are hydrolyzed by this enzyme and accordingly, are assimilated. This was illustrated in the following manner. Samples were prepared by combining 165 ml of gum arabic solution (10% w/v) with 15 grams of ice and 20 ml of each oil. An oil-in-water emulsion was then prepared of each sample by blending each sample in a Waring blender equipped with a stainless steel jacketed container. The jacketed container was filled with an ice-in-water suspension to cool the emulsion during the preparation and no emulsion temperature above 20° C. was recorded during the process of emulsification. Blending continued until the average droplet size was 2–3, $\mu$m, with some droplets as large as 10, $\mu$m, as measured using a Zeiss Standard Universal Microscope adapted with a Polaroid Camera. Droplet size was re-examined periodically to ensure against significant changes in the emulsion.

Enzyme-catalyzed hydrolysis of the oil was performed in a water jacketed beaker. The pH of the emulsion was continuously monitored and maintained with 0.1N NaOH, using a Radiometer Copenhagen Titrigraph equipped with a Type SBR2c Recorder. The beaker was maintained at 37° C. by water circulated from a Lauda K-2/RD water bath available commercially from Brinkman Instruments. During reaction, the emulsion was maintained under a nitrogen atmosphere by direct introduction of compressed nitrogen into the gas space above. The emulsion was also continuously stirred with a magnetic stirrer.

In each case, hydrolysis was conducted by adding 10 ml of each emulsified oil sample, together with 10 ml of deoxycholate (1.6% sodium deoxycholate; 32 mM NaCl) and 10 ml of deionized water into the reaction beaker. The pH was adjusted and the emulsion was stirred for at least 5 minutes to achieve thermal equilibrium at 37° C. An aliquot of the enzyme solution (10–300 µl) was then added. The rate of addition of NaOH solution which was required to maintain the desired pH was continuously monitored by the Titrigraph.

Each oil was individually tested for enzymatic hydrolysis with these enzyme preparations: purified lipase, Type VI from Porcine Pancreas obtained from Sigma Chemical Company, St. Louis, Missouri (Cat. No. L-2253); pancreatin, Grade VI activity 4X NF Grade, also obtained from Sigma Chemical Company, (Cat. No. P-1750); and bile-free pancreatic juice extracted from rats. This third preparation was collected from rats which were anesthetized with sodium pentabarbitol, at a dosage of 40 mg/Kg. Then, following a simple laparotomy, the rats were cannulated with two sections of PE 50 medical grade polyethylene tubing. The first section was inserted into the bile duct as near as possible to the hillus of the liver. The second section was inserted into the common bile-pancreatic duct, approximately 0.5 cm from the entrance of the duct into the duodenum. In this manner, bile was collected from the first cannula and bile-free pancreatic juice was collected from the second cannula into plastic centrifuge tubes which were immersed in an ice water bath. Several days samples were pooled and aliquots (1.0 ml) were lyophilized. These lyophilized fractions were reconstituted for addition to each prepared oil-in-water emulsion.

A comparison of the rates of hydrolysis of the oils by each enzyme preparation is given in TABLE 1.

TABLE 1

| Oil Emulsion | Relative Rate of Hydrolysis (Olive Oil = 1.00) | | |
|---|---|---|---|
| | Purified Porcine Pancreatic Lipase | Pancreatic | Rat Pancreatic Juice |
| Olive Oil | 1.00 | 1.00 | 1.00 |
| Trioleyltricarballylate | .001 | .007 | .001 |

Preliminary animal feeding experiments were conducted to determine the digestibility and caloric availability of test oils as follows: After quarantine, young male Sprague Dawley rats obtained from Charles River Breeding Labs, Inc., Wilmington, MA., were housed individually in metabolic cages. These rats were fed 5 g. of a complete but calorically restricted basal diet for an adjustment period of seven days as described in Booth and Gros, Caloric Availability and Digestibility of New-Type Fats, JAOCS, Vol. 40, page 551 (1973). According to the invention described herein, the rats were then randomized into 13 groups of ten animals each. Once daily for up to seven days each group was provided fresh diets consisting of 5 g. basal diet, or 5 g. basal diet supplemented with 0.5, 1.0, 2.0 or 3.0 g. of corn oil or trioleyltricarballylate. Water was given ad libitum during both the preadjustment and test periods. The animals were weighed at the beginning and the conclusion of the study, and the rat's feces were collected and monitored throughout.

Due to the poor tolerance and deaths of the rats given higher doses of the oils, only the 0.5 g. test groups were considered for the estimation of the caloric availability and percent digestibility of trioleyltricarballylate. The weight gain data obtained for the 0.5 g. dose group is shown in the following table. The weight gains for the animals fed the basal diet or basal diet plus corn oil were typical of values reported previously. Thus, the similarity of the weight gains for the test oil and the basal diet suggests that the animals derived little, if any, caloric value from trioleyltricarballylate.

TABLE 2

| Diet | Mean Body Weight (g) Initial | Mean Body Weight (g) Final | Mean Weight Gain | Weight Gain in Excess of Basal Diet |
|---|---|---|---|---|
| Basal Diet | 79.9 | 75.7 | −4.2 | — |
| Basal Diet & Corn Oil | 80.5 | 87.9 | +7.4 | +11.6 |
| Basal Diet & trioleyltricarballylate | 79.5 | 73.9 | −5.6 | −1.4 |

The low tolerance of the animals at the higher dosage levels of trioleyltricarballylate appeared, with the limited data available, to be related more to secondary metabolic disturbances caused by the laxative effects of these oils than to a direct toxicity.

No actual testing was done on the application of trioleyltricarballylate and the other oils of the present invention with respect to other than food uses. However, it would seem that based on the physical and chemical properties exhibited by trioleyltricarballylate that the various oils of the present invention could find application as lubricants, as components of cosmetics and personal care products, in pharmaceuticals, antifoam agents, industrial waxes and many others. In addition to the food uses mentioned above, trioleyltricarballylate could be used in any typical vegetable oil application, e.g. shortening, hard butters, salad oil, or industrial frying oil, provided food safety had been demonstrated satisfactorily.

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

what is claimed is:

1. A method for reducing the available calories in a food composition having an edible oil component, which method consists of replacing at least a substantial portion of the edible oil in such food composition with at least one low calorie substitute consisting of tricarballylic acid esterfied with saturated or unsaturated alcohols having straight or branched carbon chains of from 8 to 30 carbon atoms.

2. A food composition having an edible oil component having reduced available calories in which the edible oil component comprises in substantial proportion tricarballylic acid esterfied with saturated or unsaturated alcohols having straight or branched carbon chains of 8 to 30 carbon atoms.

* * * * *